United States Patent [19]
Palumbo

[11] Patent Number: 5,225,970
[45] Date of Patent: Jul. 6, 1993

[54] TWIST-IN MOUNTING FOR ELECTROMECHANICAL COMPONENT

[76] Inventor: Nicholas R. Palumbo, 28 Redwood Dr., Cumberland, R.I. 02864

[21] Appl. No.: 762,586

[22] Filed: Sep. 19, 1991

[51] Int. Cl.$^5$ .............................................. H05K 7/02
[52] U.S. Cl. .................................... 361/417; 248/27.1
[58] Field of Search ................ 248/27.1, 221.3, 231.9; 24/590; 292/352, 354, 355; 361/417; 403/348

[56] References Cited

U.S. PATENT DOCUMENTS

| | | | |
|---|---|---|---|
| 2,272,688 | 12/1942 | Catron | 248/27.1 |
| 2,689,700 | 9/1954 | Drury | 248/27.1 |
| 3,279,728 | 10/1966 | Campbell | 248/27.1 |
| 4,653,708 | 3/1987 | Rich | 248/27.1 |
| 4,715,569 | 12/1987 | Essig et al. | 248/27.1 |

Primary Examiner—Leo P. Picard
Assistant Examiner—D. Sparks
Attorney, Agent, or Firm—Sylvia L. Boyd; H. E. Stubbs

[57] ABSTRACT

Twist-in mounting structure centered on a component surface mounts a component to a single panel aperture. Each of a pair of capture tabs has a free end away from the structure's center; an interference surface slopes from the tab free end downwardly toward a raised capture plateau and inwardly toward the center. Each of a pair of spring locking arms lies between two capture tabs, providing a free bearing end adjacent the center, and is pivotable at an end spaced away from the center responsive to force on the bearing end, between unstressed, depressed, and locking positions. In assembly, the tabs pass through the aperture, while the arms are depressed by the panel; with panel against plateaus, the component is twisted to cause aperture edges and tabs to interfere; thereafter the locking arm free ends spring through the aperture into locking position. Once assembled, tabs and plateaus cooperate with the panel positively to position the component against axial displacement, and the locking arms cooperate with the panel positively to position the component against rotational displacement.

13 Claims, 4 Drawing Sheets

TWIST-IN MOUNTING FOR ELECTROMECHANICAL COMPONENT

This invention relates to an improved panel-mounting electromechanical component, in particular a component having external mounting structure providing twist-in mounting to a single aperture in a panel.

Electromechanical components, such as switches, relays, electrically operated buzzers, and the like, are assembled to panels in various ways. Assembly by means of screws is relatively expensive and inconvenient, requiring the supply of screws and the use of a tool. To avoid the need for screws and tools, various types of push-in or twist-in mounting components have been designed to mount to apertures provided in the panel for the purpose. However, such designs have themselves entailed various difficulties; many of them require that for each component the panel be provided with more than one aperture, of different outlines. This design can create narrow and weakened "necks" between such associated apertures, and may require a plurality of dies to make the various apertures. For other such mountings, to accommodate a range of component sizes, it has been necessary to provide apertures of different dimensions, or spaced differently, which is inconvenient and increases the expense of manufacture. Components of different sizes, having such mountings, cannot be interchanged without repunching the panel to accommodate them.

Some push-in or twist-in mountings operate by means of structure attached to the side or outer edge of the component casing, effectively increasing the size of the component, and thereby increasing the required spacing of components on the panel to which they are secured. This may involve a costly redesign of an appliance, which may offset any economy resulting from the mounting structure itself. Such mounting structures may also require the use of knobs larger than those used for other components, to provide an acceptable cosmetic appearance.

Some existing push-in or twist-in mountings have also been subject to being accidently dislodged under axial forces exerted on the mounted component, or to "dishing" of the panel under such forces during assembly, causing interference between component actuating knob and panel. Some such mountings have permitted slack or axial travel of the mounted component with respect to the panel, giving a very unsatisfactory loose feel to the component in use.

It is therefore an object of the present invention to provide a twist-in component mounting which obviates the need for screws or assembling tools, which is mounted to a single panel aperture, which is adaptable to use on components of various sizes while mounting to a panel aperture of a standard size and shape, which has a relatively compact "footprint" and therefore is readily concealed by a component knob, which is resistant to being dislodged during use of the component, which reduces dishing of the panel, and which firmly retains the component to the panel without slack.

SUMMARY OF THE INVENTION

An electromechanical component designed for assembly to a single aperture in a panel has a housing made of polymeric material, having a mounting surface which when the component is assembled to a panel is adjacent a first panel surface. Twist-in mounting structure is integrally molded with the housing mounting surface, and comprises a barrel extending outwardly of the housing mounting surface, the barrel having cylindrical surface portions concentric about its center. Panel capture tabs are symmetric about two mutually orthogonal diameters of the barrel and extend away from the barrel cylindrical surface portions, each tab having an outer surface terminating in a free end spaced away from the barrel. An interference surface slopes from the tab free end downwardly toward the housing mounting surface and inwardly toward the barrel, and an interference region is bounded by the interference surface. The mounting surface provides below each capture tab interference surface a cooperative raised panel capture plateau; a panel capture tab interference surface and adjacent panel capture plateau include an acute angle between them.

Spring locking arms are symmetric about the two mutually orthogonal diameters of the barrel, and are angularly spaced between the panel capture tabs, each spring arm being pivotably connected to the housing mounting surface at a pivot end spaced away from the barrel, and providing a free bearing end adjacent the barrel.

Each spring locking arm is pivotable, responsive to a varying force exerted on its free bearing end, between an unstressed position in which the bearing end is outward of the mounting surface beyond the panel capture tab interference surface, a depressed position in which the bearing end in level with the panel capture plateau, and a locking position in which the bearing end is between the panel capture plateau and the panel capture tab outer surface.

The panel capture tabs and panel capture plateaus cooperate, in assembled condition of the component to a panel, with a panel single aperture boundary positively to position the component against displacement parallel with the barrel, and the spring locking arms cooperate, in assembled condition of the component to a panel, with a panel single aperture boundary positively to position the component against rotational displacement about the barrel.

In preferred embodiments, the housing provides spring locking arm supports; the side surfaces of a spring locking arm, in the depressed position and the locking position of the spring locking arm, are adjacent and generally aligned with the housing locking arm supports for support of the spring locking arm against torsion about the barrel center. The panel capture tabs and spring locking arm free bearing ends are sized and positioned such that during assembly first the capture tabs and subsequently the free bearing ends pass through the pair of aperture wing boundary portions. Thus only a single panel aperture is required for mounting the component.

The panel under surface engages the mounting structure panel capture plateaus in the depressed position, so that the panel interference edges interfere with the mounting structure interference regions at a location determined by the thickness of the panel, for snug retention of the component to the panel.

DETAILED DESCRIPTION OF THE INVENTION

Figure 1:
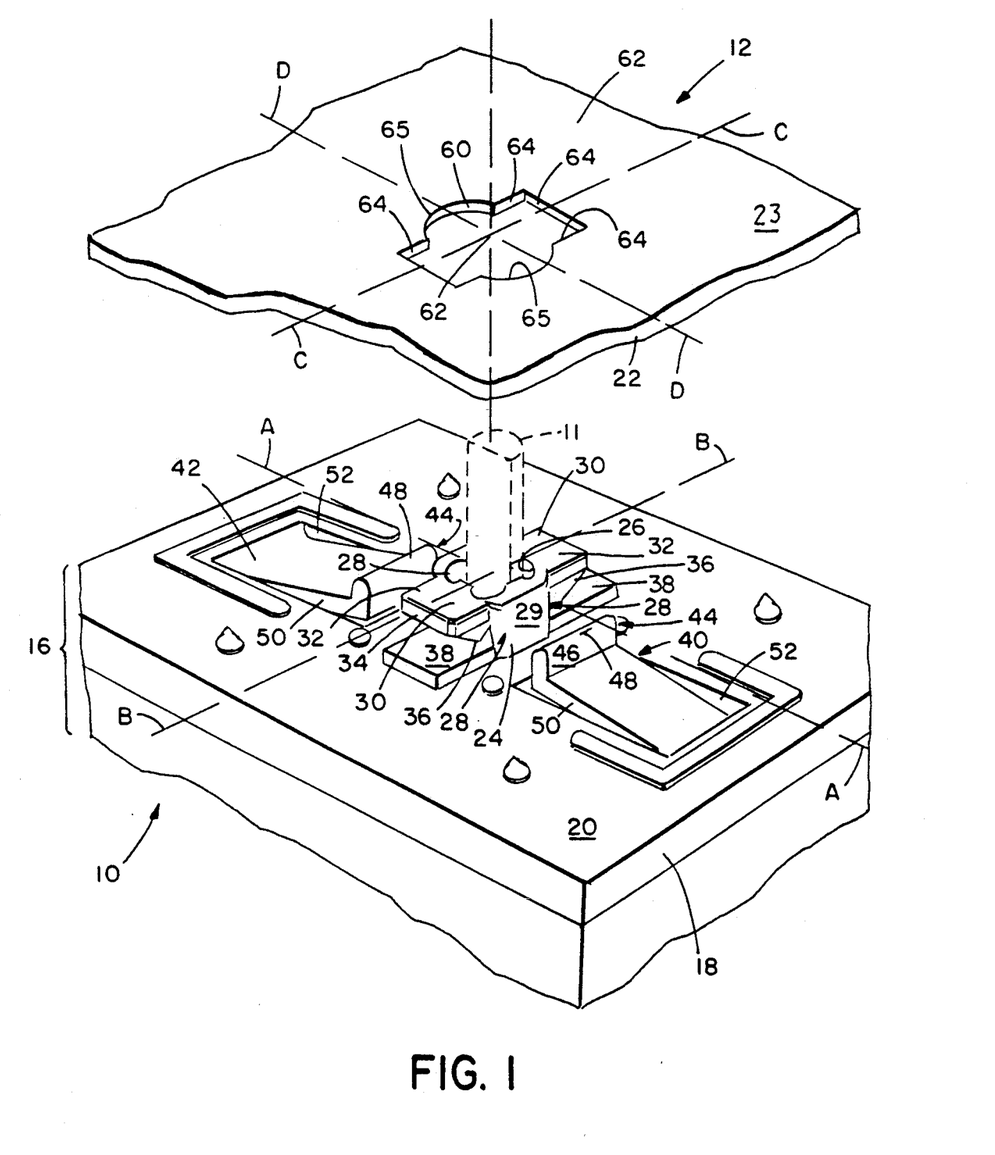
FIG. 1 is a perspective view of the component housing with apertured panel to which it is to be mounted, according to the invention.

Referring now to the drawing, and in particular to FIG. 1, according to the invention, an electric component 10 provides mounting structure such that the component can be assembled by a twist-in action to a single aperture 14 in a panel 12. Component 10 as shown in the drawing is operated by means of a control shaft 11, but the invention is not limited to components operated by a control shaft. Component 10 may be a pushbutton switch or a rotary switch, or other electromechanical component. Such a component may be used in a household appliance, for example a dishwasher.

The mounting structure of component 10 is adapted for twist-in mounting to a panel 12 whose under and upper surfaces 22, 23 are joined by a continuous wall defining aperture 14. The continuous wall has arcuate boundary portions 60 circularly symmetric about a center 62, and a pair of aperture wing boundary portions defined by walls 64 symmetric about two mutually orthogonal diameters C and D of circularly symmetric portions 60. The intersection of circularly symmetric continuous wall portions 60 with upper surface 23 of panel 12 defines interference edges 65.

Referring now further to FIGS. 2, 3, 4, 5 and 6 as well as FIG. 1, according to the invention, component 10 provides a housing 16 including a cover 18 molded of thermoplastic material such as 15% glass reinforced polyester. A suitable material is "Valox DR-48" made by General Electric. Cover 18 of housing 16 has an exterior mounting surface 20 which when component 10 is assembled to panel 12 is adjacent the under surface 22 of panel 12. Twist-in mounting structure is integrally molded with mounting surface 20 and lies within its outline in plan view; thus, the mounting structure does not increase the size of the component in plan view.

Figure 2:
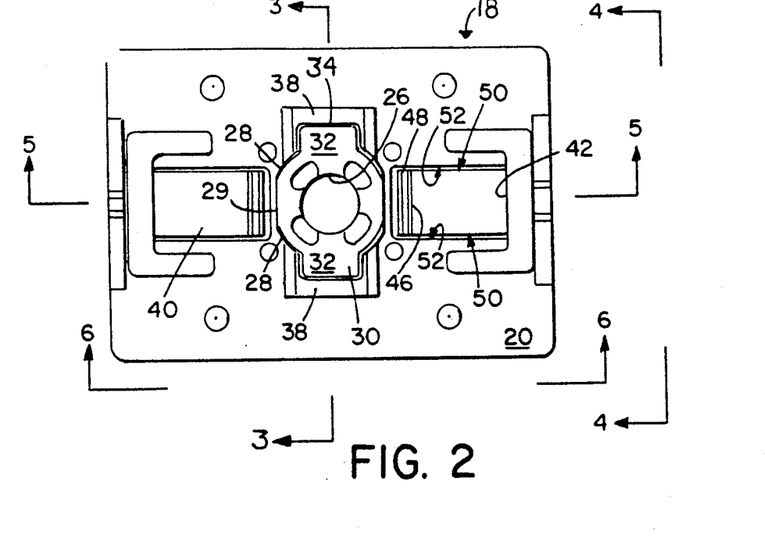
FIG. 2 is a plan view of the component housing according to the invention.
Figures 3, 5:
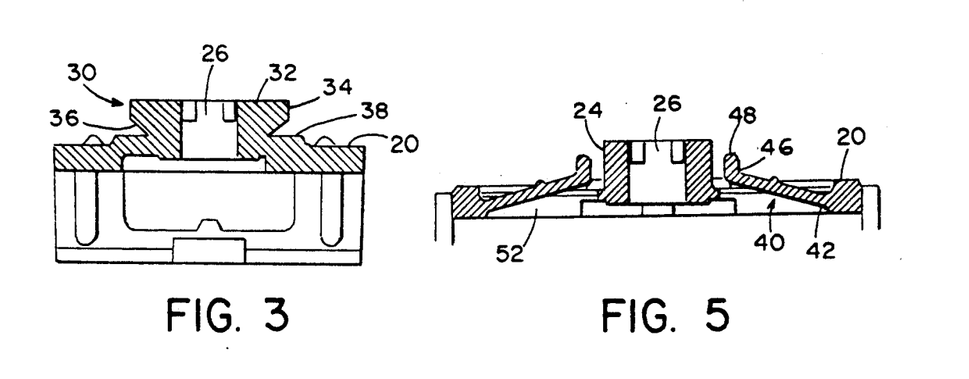
FIG. 3 is a section taken on line 3—3 of FIG. 2.
FIG. 5 is a section taken on line 5—5 of FIG. 2.
Figure 4:
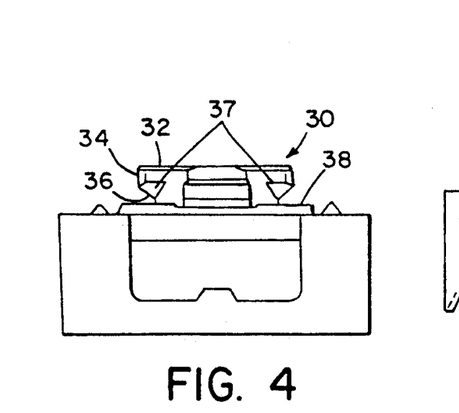
FIG. 4 is an elevation taken on line 4—4 of FIG. 2.
Figure 6:
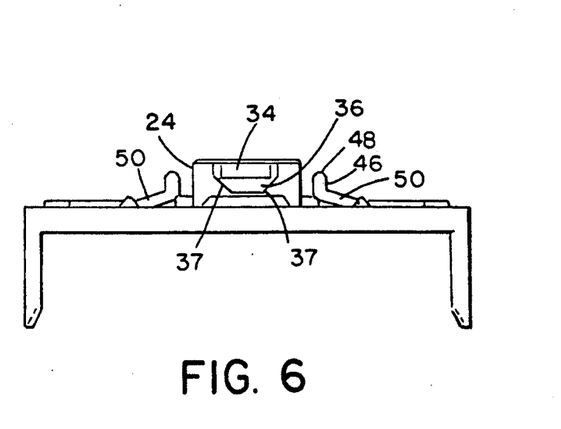
FIG. 6 is an elevation taken on line 6—6 of FIG. 2.

The twist-in mounting structure comprises a barrel 24 extending outwardly of mounting surface 20 and defining a central aperture 26 for passage of component control shaft 11. In embodiments adapted for mounting electromechanical components not controlled by a control shaft, no central aperture need be provided. Barrel 24 has four surface regions 28 all being portions of a cylindrical surface concentric about the center of barrel 24. On two opposite sides of barrel 24 the cylindrical surface portions 28 are joined by flats 29.

The twist-in mounting structure further comprises two panel capture tabs 30 symmetric about two mutually orthogonal (extended) diameters A and B of barrel 24. Each panel capture tab 30 extends away from a pair of barrel cylindrical surface regions 28. Each panel capture tab 30 has an outer surface 32 (spaced from mounting surface 20) terminating in a free end 34 spaced away from barrel 24. A generally flat extended surface 36 slopes downwardly from free end 34 toward mounting surface 20 and inwardly toward barrel 24.

Case cover mounting surface 20 provides, below each capture tab surface 36, a raised panel capture plateau 38, cooperating with surface 36 as will be described during assembly to panel 12. Interference surface 36 meets barrel 24 just above the adjacent panel capture plateau 38, barrel and plateau including an acute angle between them (FIG. 3). A slight neck or gap is provided between surface 36 and corresponding plateau 38, as required by molding considerations.

The twist-in mounting structure further comprises two spring locking arms 40, symmetric about the two mutually orthogonal diameters of barrel 24, extending toward barrel flats 29 and angularly equally spaced between the two panel capture tabs 30. Each spring locking arm 40 is pivotably connected to mounting surface 20 at a pivot end 42 spaced away from barrel 24, and provides a free end 44 adjacent barrel 24. Each spring locking arm free end 44 provides a locking surface 46 on free end 44, remote from barrel 24.

Each spring locking arm 40 is pivotable, responsive to varying force exerted downwardly (i.e. toward mounting surface 20) on the top 48 of its free bearing end 44, between a first, unstressed position in which bearing end top 48 is outward of mounting surface 20 beyond panel capture tab surface 36, a second, depressed position in which bearing end top 48 is level with panel capture plateau 38, and a third, locking position in which bearing end top 48 is between panel capture plateau 38 and panel capture tab free end 34.

Each spring locking arm 40 has two side surfaces 50 extending between its pivot end 42 and its free bearing end 44. Case cover 18 provides side supports for the spring locking arms. In a preferred embodiment, as seen in FIG. 1, housing cover 18 provides a recess for locking arm 40, locking arm pivot end 42 being within the thickness of cover 18, such that locking arm 40 lies partly within the thickness of cover 18. The recess provides side support surfaces 52. In the unstressed position of locking arm 40, arm 40 extends upwardly out of cover 18 from its pivot end 42. However in the depressed position of locking arm 40, responsive to the greatest force exerted downwardly on free end top 48, locking arm 40 lies generally parallel with the plane of cover 18, such that its side surfaces 50 are generally aligned with and adjacent recess side support surfaces 52. In the locking position, spring locking arm 40 lies at a slight angle to side support surfaces 52 but locking arm sides 50 remain sufficiently aligned with side support surface 52 that locking arm 40 is supported against torsion about the axis of barrel 24.

Spring locking arm free bearing ends 44 and panel capture tab free ends 34 are equally spaced from the center of barrel 24 as projected on the plane of mounting surface 20. The function of this feature will be described in what follows.

Lead-in surfaces (beveled or chamfered) are provided on locking arm free ends 44 and on panel capture tabs 30, as shown in the figures, including particularly lead-in surfaces 37 (FIGS. 4 and 6) adjacent surfaces 36. Such lead-in surfaces increase the ease of assembly of component to panel.

Figure 11:
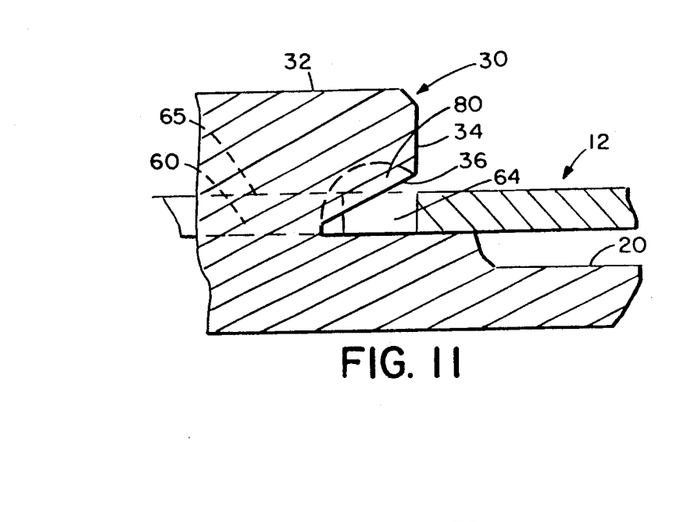
FIG. 11 shows a detail of the component housing and the apertured panel in a first stage of assembly.
Figure 12:
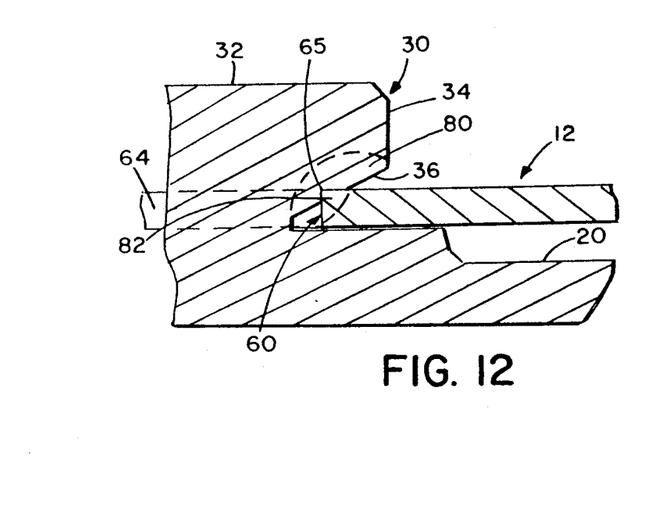
FIG. 12 shows the elements of FIG. 11 in a later stage of assembly, when the panel is relatively harder than the component housing.

In assembling component 10 to panel 12, component housing 16 and panel aperture 14 are initially aligned as seen in FIG. 1, i.e. with panel capture tabs 30 aligned with wing boundary portions 64 of panel aperture 14. The assembler pushes component 10 and panel 12 together, such that panel capture tabs 30 pass through the portions of aperture 14 bounded by aperture wing boundary portions 64. The relationship of a panel capture tab 30 and the aperture portions of panel 12 is shown in FIG. 11. Panel capture tab 30 provides a tab interference region 80 bounded by sloped surface 36; panel 12 provides a panel interference region 82 adjacent interference edge 65 of the curved portions of panel aperture 14 (FIG. 12).

When tabs 30 are aligned with aperture wing boundary portions 64 and the assembler pushes component 10 and panel 12 together as described, locking arm bearing ends 44 bear against under surface 22 of panel 12, biasing component 10 and panel 12 apart. Force must be exerted to the point that panel under surface 22 contacts panel capture plateaus 38. In this condition ("depressed" condition) the spring locking arms 40 are depressed within the recesses of cover 18 to the point that free end tops 48 are level with plateaus 38. It will be apparent that during assembly tops 48 cannot be depressed further; that is, regardless of the thickness of panel 12 to which component 10 is being assembled, the load on spring locking arms 40 is the same. The predictability of this load is an advantage in the design and manufacture of component housing 16.

Figure 13:
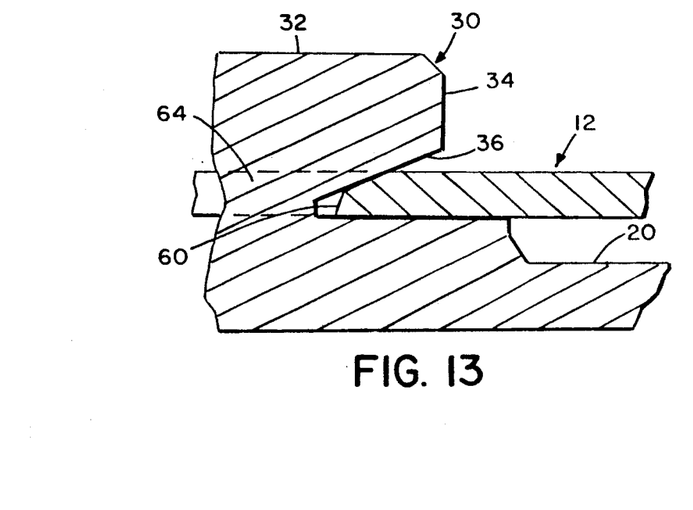
FIG. 13 shows the elements of FIG. 11 in a later stage of assembly, when the panel is relatively less hard than the component housing.

Maintaining the necessary force to keep panel under surface 22 in contact with plateaus 38, the assembler twists housing 16 with respect to panel aperture 14. Barrel cylindrical surfaces 28 rotate within aperture arcuate boundary portions 60, up to the point that spring locking arm free ends 44 underlie the outer ends of aperture wing boundary portions 64. During this rotation, tab interference regions 80 and panel interference regions 82 are jammed together. If the panel is made of material relatively harder or of greater compressive strength than the component housing, for example of metal, the interfering edges 65 of the panel aperture will cut into a tab 30, deforming it as shown in FIG. 12. Depending on the thickness of the panel, a greater or lesser amount of material may be removed from tab interference region 36. If the panel is made of material relatively less hard or of less compressive strength than panel 12, for example of polypropylene, the interfering edge portions of panel 12 will be deformed as shown in FIG. 13. In either case a tight fit is achieved.

At the completion of the rotation of component 10 through 90 degrees with respect to panel 12, the locking arm free ends 44 spring outwardly through the wing boundary portions 64 of panel aperture 14 into the locking position. An audible click or snap is emitted, providing confirmation to the assembler that the component has been correctly and completely assembled to the panel.

At the completion of the twist-in assembly, after the locking arm free ends 44 spring outwardly through the wings of aperture 14, panel 12 is captured snugly between plateaus 38 and tabs 30. Therefore there is no axial play or slack between component 10 and panel 12. In addition, spring locking arms 40 remain stressed in the locking position by the pressure of panel under surface 22 downwardly on arms 40, which contributes to the firm retention of component 10 to panel 12.

Because panel capture tab free ends 34 and spring locking arm free ends 44 lie at equal distances from the center of the mounting structure, there is clearance for the capture tabs to pass through the aperture wing boundary portions during assembly, while the spring locking arm free ends also pass through the same wing boundary portions and in assembled condition are positioned adjacent the ends of the wing boundary portions, for good retention of the component to the panel and for preventing component rotation.

Panel capture plateaus 38 support panel 12 during assembly of the component, preventing "dishing" of the panel. Accidental dislodging of the component by impact on shaft 11 is also prevented, since axial impact alone will not disengage the panel capture tabs. However, the component is removable, by means of a tool which depresses locking arm free ends 44 beneath panel 12, permitting rotation of component 10 to a position in which panel capture tabs 30 may pass through panel aperture wing portions. The component may then be remounted.

Because the mounting structure elements (barrel, panel capture tabs, and locking arm free ends) which engage the panel are all located compactly close together, the mounting structure may be completely concealed by a knob, of the kind which covers a standard mounting, secured to shaft 11.

Further, because the mounting structure elements that engage the panel are all located close to the center of the component cover, and are positioned independently of the component sides, the mounting structure of the invention may be used on components of a large range of sizes, without redesign. Further, all such components of whatever size, provided with mounting structure according to the invention, can be mounted to a standard panel aperture. Thus, if necessary, components of different sizes, but provided with the mounting structure of the invention, may be interchanged, without the need to repunch the panel.

Figure 7:
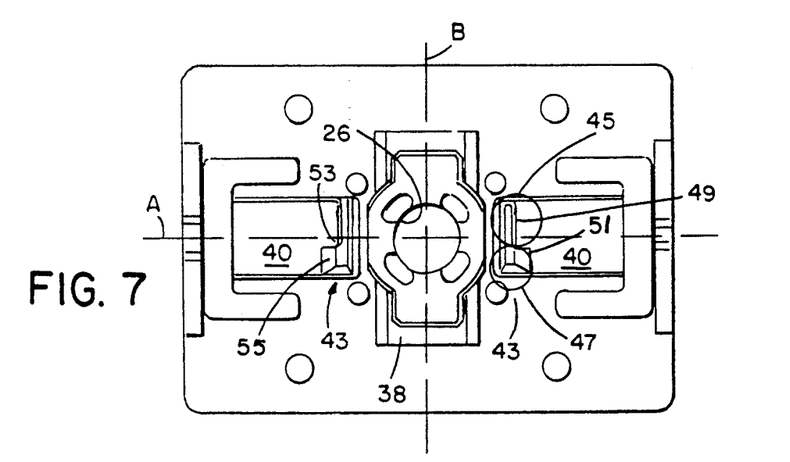
FIG. 7 is similar to FIG. 2 but shows an alternative embodiment according to the invention.
Figure 8:
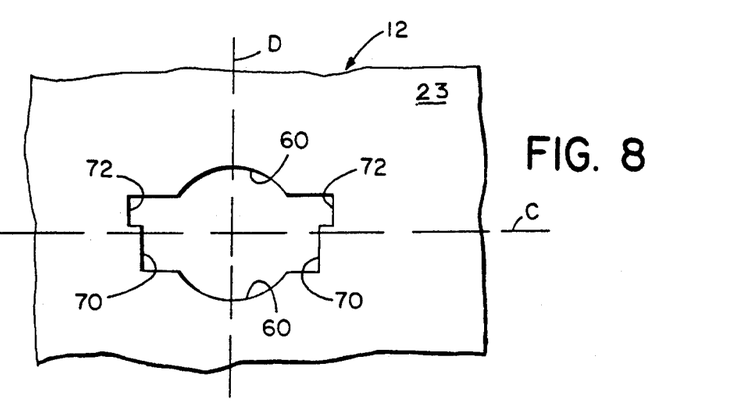
FIG. 8 shows a first alternative form of the panel single aperture according to the invention.

It will be observed that as a result of the symmetries of the component mounting structure and panel aperture, the component shown in FIGS. 1-6 can be mounted to the panel 12 shown in FIG. 1 in either of two orientations. In some applications it is desirable to limit assembly to only one orientation. Referring now to FIGS. 7 and 8, a component mounting structure and single panel aperture according to the invention are shown, having a modification to limit assembly to a single orientation.

In this embodiment, each locking arm free end 43 (FIG. 7) is unsymmetric, being divided into a thinner portion 45 and a thicker portion 47, providing a locking surface comprising two flats 49, 51 connected by a curve 53. Correspondingly the panel aperture wing boundary portions (FIG. 8) comprise a nearer (to the aperture center) edge portion 70 and a farther edge portion 72. It will be observed that whereas the aperture of FIG. 1 is symmetric about both axes C and D, that of FIG. 8 is symmetric only about axis D; similarly, whereas the component mounting structure of FIG. 1 is symmetric about both axes A and B, that of FIG. 7 is symmetric only about axis B. In assembly, locking arm free end 43 can seat in the aperture wings of FIG. 8 only with locking surface flat 49 adjacent nearer aperture edge portion 70 and with locking surface flat 51 adjacent farther aperture edge portion 72. Such positioning is possible only in a single orientation of component 10 and panel 12.

Figure 10:
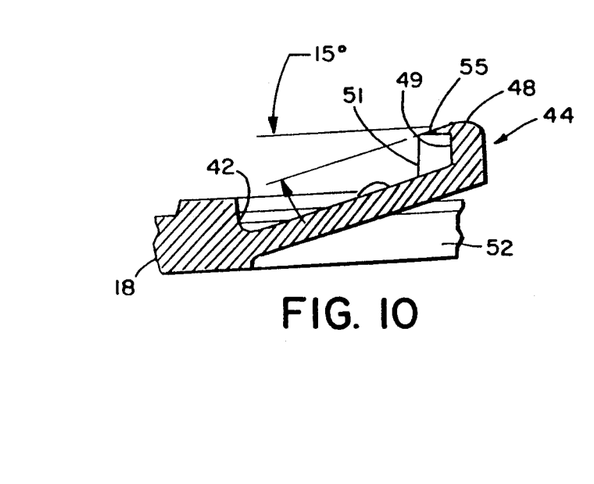
FIG. 10 is a detail showing of the structure shown in FIG. 7.

Referring to FIG. 10, in the single-orientation embodiment of FIG. 7, flat 51 is connected to free end top surface 48 by a surface 55 which slopes at about 15 degrees to the horizontal in the unstressed position of locking arm 40. This slope or relief ensures that in the depressed position of locking arm 40, free end top surface 48 is the surface which bears against under surface 22 of panel 12, so that the deflection of arm 40 remains the same as the deflection of arm 40 shown in FIGS. 1-6.

Figure 9:
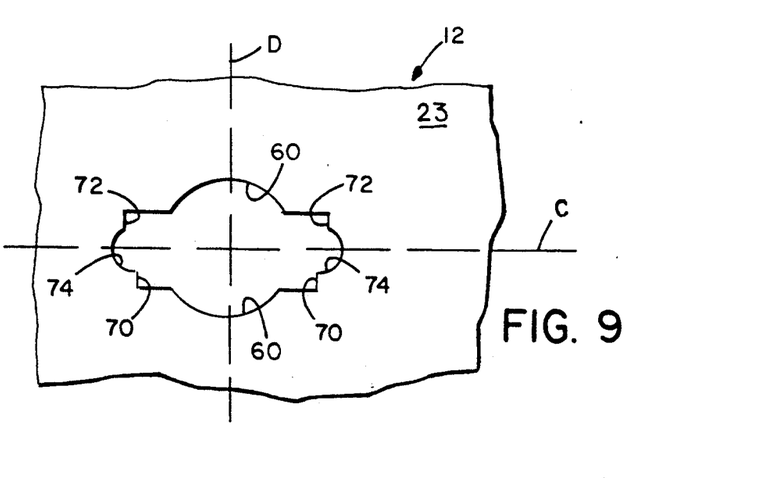
FIG. 9 shows a second alternative form of the panel single aperture according to the invention.

Referring now to FIG. 9, the panel aperture of FIG. 8 may be further modified to provide two distal curved boundary elements 74 as part of the aperture wing boundary portions. Curved elements 74 permit components mounted by means of two screws, rather than by the twist-in mounting disclosed herein, to be assembled to the same aperture. This panel aperture will also accept the twist-in mounting shown in FIG. 7. Thus an appliance manufacturer can provide all panel component apertures of a single design, indifferently to whether each component will be mounted by a twist-in mounting according to the invention, or by conventional screws.

What is claimed is:

1. For assembly to a single aperture in a panel, an electromechanical component having
   a housing made of polymeric material and having a mounting surface which when said component is assembled to a panel is adjacent a first panel surface, said component housing having twist-in mounting structure integrally molded with said housing mounting surface,
   said twist-in mounting structure comprising
   a barrel extending outwardly of said housing mounting surface,
   panel capture tabs symmetric about two mutually orthogonal diameters of said barrel and extending away from said barrel, each said tab having an outer surface terminating in a free end spaced away from said barrel, a panel capture tab interference surface sloping from said free end downwardly toward said housing mounting surface and inwardly toward said barrel, and an interference region bounded by said interference surface,
   said mounting surface providing a cooperative raised panel capture plateau below said capture tab interference surface, said panel capture tab interference surface and said panel capture plateau including an acute angle between them,
   spring locking arms symmetric about said two mutually orthogonal diameters of said barrel, and angularly spaced between said panel capture tabs, each said spring locking arm being pivotably connected to said housing mounting surface at a pivot end spaced away from said barrel, and providing a free bearing end adjacent said barrel,
   said spring locking arm being pivotably, responsive to a varying force exerted on said free bearing end toward said housing mounting surface, between an unstressed position in which said bearing end is outward of said mounting surface beyond said panel capture tab interference surface, a depressed position in which said bearing end is level with said panel capture plateau, and a locking position in which said bearing end is between said panel capture tab interference plateau and said panel capture tab outer surface,
   said panel capture tabs and said panel capture plateau cooperating, in assembled condition of said component to a panel, with a panel positively to position said component against displacement parallel with said barrel, and
   said spring locking arms cooperating, in assembled condition of said component to a panel, with a panel positively to position said component against rotational displacement about said barrel.

2. The housing of claim 1, wherein said spring locking arm free bearing end provides
   an upper bearing surface parallel with said housing mounting surface,
   first and second flat keying surfaces perpendicular to said upper bearing surface,
   said second flat keying surface being spaced further from said mounting structure barrel than said first flat keying surface,
   said locking arm free bearing end being relieved adjacent said second flat keying surface.

3. The component of claim 1, each said spring locking arm having side surfaces extending between said pivot end and said free bearing end,
   said housing providing spring locking arm supports, said side surfaces of a said spring locking arm, in said depressed position and said locking position of said spring locking arm, being adjacent and generally aligned with said housing locking arm supports for support of said spring locking arm against torsion about an axis through said barrel center.

4. The component of claim 1, said twist-in mounting structure being located centrally on said housing mounting surface.

5. An electromechanical component having interfaces for assembly to a panel having lower and upper surface joined by a continuous wall defining an aperture having arcuate boundary portions circularly symmetric about a center and defining interference edges, and a pair of aperture wing boundary portions symmetric about at least one axis of symmetry, said component comprising
   a housing made of polymeric material and having a mounting surface which when said component is assembled to a panel is adjacent a panel lower surface, said component housing having twist-in mounting structure integrally molded with said housing mounting surface,
   said twist-in mounting structure comprising
   a barrel extending outwardly of said housing mounting surface, said barrel having cylindrical surface portions concentric about the center of said barrel,
   panel capture tabs symmetric about two mutually orthogonal diameters of said barrel and extending away from said barrel cylindrical surface portions, each tab having an outer surface terminating in a free end spaced away from said barrel, an interference surface sloping from said tab free end downwardly toward said housing mounting surface and inwardly toward said barrel, and an interference region bounded by said interference surface,
   said mounting surface providing below each said capture tab interference surface a cooperative raised panel capture plateau, a said panel capture tab interference surface and an adjacent said panel capture plateau including an acute angle between them, spring locking arms symmetric about said two mutually orthogonal diameters of said barrel, and angularly spaced between said panel capture tabs, each said spring arm being pivotably connected to said housing mounting surface at a pivot end spaced away from said barrel, and providing a free bearing end adjacent said barrel.

said spring locking arm being pivotably, responsive to a varying force exerted on said free bearing end toward said housing mounting surface, between an unstressed position in which said bearing end is outward of said mounting surface beyond said panel capture tab interference surface, a depressed position in which said bearing end is level with said panel capture plateau and panel interference edges interfere with said panel capture tab interference regions, and a locking position in which said bearing end is between said panel capture plateau and said panel capture tab outer surface, and extends through panel aperture wing boundary portions, said locking arm bearing ends and said panel capture tab free ends being equally spaced from the center of said barrel as projected on the plane of said housing mounting surface, said panel capture tabs and said panel capture plateaus cooperating, in assembled condition of said component to a panel, with a panel positively to position said component against displacement parallel with said barrel, and said spring locking arms cooperating, in assembled condition of said component to a panel, with a panel positively to position said component against rotational displacement about said barrel, 6. The component of claim 5, each said spring locking arm having side surfaces extending between said pivot end and said free bearing end, said housing providing spring locking arm supports, said side surfaces of a said spring locking arm, in said depressed position and said locking position of said spring locking arm, being adjacent and generally aligned with said housing locking arm supports for support of said spring locking arm against torsion about said barrel center.

7. The component of claim 5, said panel capture tabs and said spring locking arm free bearing ends being sized and positioned such that in assembly to a panel having a single aperture first said panel capture tabs and subsequently said locking arm free bearing ends pass through a single pair of panel aperture wing boundary portions.

8. A component twist-in mounting assembly comprising a panel having lower and upper surfaces joined by a continuous wall defining an aperture, said continuous wall having arcuate boundary portions circularly symmetric about a center, and a pair of aperture wing boundary portions symmetric about at least one of two mutually orthogonal diameters of said circularly symmetric portions, the intersection of said circularly symmetric continuous wall portions with the panel upper surface forming interference edges, said panel having panel interference regions adjacent said interference edges, and an electromechanical component having a housing made of polymeric material and having a mounting surface which when said component is assembled to said panel is adjacent said panel lower surface, said component housing having twist-in mounting structure integrally molded with said housing mounting surface, said twist-in mounting structure comprising a barrel extending outwardly of said housing mounting surface, said barrel having cylindrical surface portions concentric about the center of said barrel, panel capture tabs symmetric about two mutually orthogonal diameters of said barrel and extending away from said barrel cylindrical surface portions, each panel capture tab having an outer surface terminating in a free end spaced away from said barrel, and an interference surface sloping from said panel capture tab free end downwardly toward said housing mounting surface and inwardly toward said barrel, each said panel capture tab having a tab interference region bounded by said interference surface, said mounting surface providing below each said interference surface a cooperative raised panel capture plateau, said interference surface and an adjacent said panel capture plateau including an acute angle between them, spring locking arms symmetric about said two mutually orthogonal diameters of said barrel, and angularly, spaced between said panel capture tabs, each said spring locking arm being pivotably connected to said housing mounting surface at a pivot end spaced away from said barrel, and providing a free bearing end adjacent said barrel, said spring locking arm being pivotably, responsive to a varying force exerted on said free bearing end toward said component mounting surface, between an unstressed position in which said bearing end is outward of said mounting surface beyond said panel capture tab interference surface, a depressed position in which said bearing end is level with said panel capture plateau and said panel interference regions interfere with said capture tab interference regions, and a locking position in which said bearing end is between said panel capture plateau and said panel capture tab outer surface, and extends through said panel aperture wing boundary portions, said locking arm bearing ends and said panel capture tab free ends being equally spaced from the center of said barrel as projected on the plane of said housing mounting surface, said panel capture tabs and said panel capture plateaus cooperating, in assembled condition of said component to said panel, with said panel aperture positively to position said component against displacement parallel with said barrel, and said spring locking arms cooperating, in assembled condition of said component to said panel, with said panel aperture positively to position said component against rotational displacement about said barrel.

9. The component twist-in mounting assembly of claim 8, each said spring locking arm having side surfaces extending between said pivot end and said free bearing end, said housing providing spring locking arm supports, said side surfaces of a said spring locking arm, in said depressed position and said locking position of said spring locking arm, being adjacent and generally aligned with said housing locking arm supports for support of said spring locking arm against torsion about said barrel center.

10. The assembly of claim 8, said panel capture tabs and said spring locking arm free bearing ends being sized and positioned such that during assembly first said panel capture tabs and subsequently said locking arm free bearing ends pass through said pair of aperture wing boundary portions.

11. The assembly of claim 8, said panel under surface engaging said mounting structure panel capture plateaus in said depressed position, whereby said panel interference regions interfere with said mounting structure interference regions at a location determined by the thickness of said panel, for snug retention of said component to said panel.

12. The housing of claim 8, wherein said spring locking arm free bearing end provides am upper bearing surface parallel with said housing mounting surface, first and second flat keying surfaces perpendicular to said upper bearing surface, said second flat keying surface being spaced closer to said spring locking arm pivot end than said first flat keying surface, said locking arm free bearing end being relieved adjacent said second flat keying surface.

13. For assembly to a single aperture in a panel, an electromechanical component having a housing made of polymeric material and having a mounting surface which when said component is assembled to a panel is adjacent a first panel surface, said component housing having twist-in mounting structure integrally molded with said housing mounting surface, said twist-in mounting structure comprising panel capture tabs symmetric about two mutually orthogonal diameters of said mounting structure and extending away from the center of said mounting structure, each said tab terminating in a free end spaced away from said center, and having panel capture tab interference surface sloping from said tab free end downwardly toward said housing mounting surface and inwardly toward said center, and panel capture tab interference region bounded by said interference surface, said mounting surface providing a cooperative raised panel capture plateau below said panel capture tab interference surface, said panel capture tab interference surface and said panel capture plateau including an acute angle between them, spring locking arms symmetric about said two mutually orthogonal diameters, and angularly spaced between said panel capture tabs, each said spring locking arm being pivotably connected to said housing mounting surface at a pivot end spaced away from said center, and providing a free bearing end adjacent said center, said spring locking arm being pivotably responsive to a varying force exerted on said free bearing end toward said housing mounting surface, between an unstressed position in which said bearing end is outward of said mounting surface beyond said panel capture tab interference surface, a depressed position in which said bearing end is level with said panel capture plateau, and a locking position in which said bearing end is between said panel capture plateau and said panel capture tab outer surface, said panel capture tab interference region and said panel capture plateau cooperating, in assembled condition of said component to a panel, with a panel by means of an interference positively to position said component against displacement toward and away from a panel, and said spring locking arms in said locking position cooperating, in assembled condition of said component to a panel, with a panel positively to position said component against rotational displacement in a plane parallel with a panel.

* * * * *